(No Model.)
R. D. MERSHON.
STATION POTENTIAL INDICATOR.
No. 551,982. Patented Dec. 24, 1895.
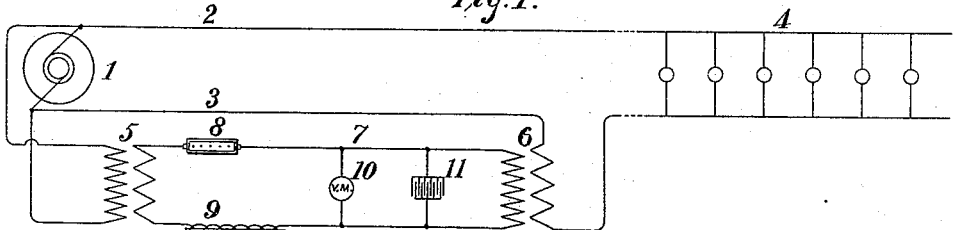
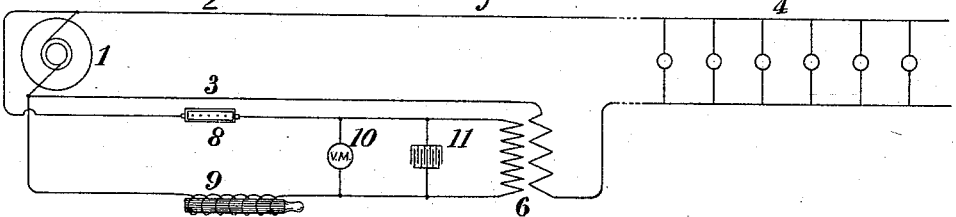
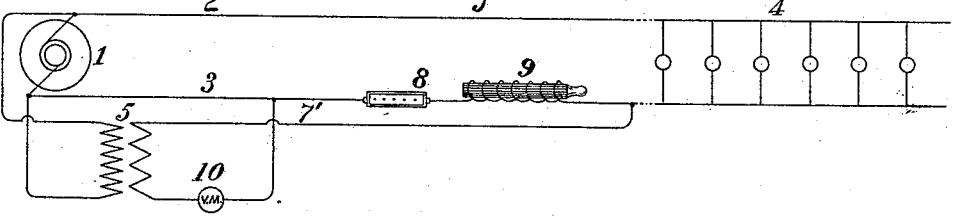
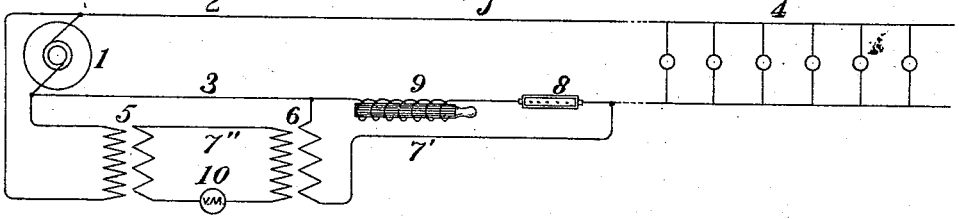
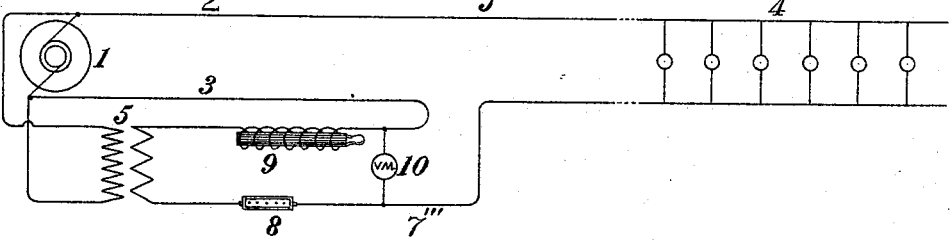
WITNESSES:
INVENTOR
Ralph D. Mershon
BY
Terry, MacKaye & Carr
ATTORNEYS.

UNITED STATES PATENT OFFICE.

RALPH D. MERSHON, OF PITTSBURG, PENNSYLVANIA.

STATION POTENTIAL-INDICATOR.

SPECIFICATION forming part of Letters Patent No. 551,982, dated December 24, 1895.

Application filed April 29, 1895. Serial No. 547,558. (No model.)

*To all whom it may concern:*

Be it known that I, RALPH D. MERSHON, a citizen of the United States, residing in Pittsburg, in the county of Allegheny and State of Pennsylvania, have invented a new and useful Improvement in Station Potential-Indicators, (Case No. 641,) of which the following is a specification.

My invention relates to alternating-electric-current apparatus and more particularly to means employed for indicating at the generating-station the potential at the load in an alternating-current circuit; and it has for its object to provide a method and means whereby the potential at the load may be accurately indicated at the generating-station whatever may be the ohmic and inductive drop in the line or the power factor of the load. Where the transmission-circuits are of considerable length, there is a large drop in potential between the generator and the load due both to the ohmic resistance and the self-induction of the line, and also a considerable variation in drop due to the character as well as to the amount of the load. Since it is necessary to regulate the generator in accordance with the potential desired at the load, it is extremely desirable that some means be employed at the generating-station which will indicate accurately the potential at the load end of the circuit. Indicating devices of this general character have heretofore been devised which will give satisfactory indications where there is practically no difference of phase between the electromotive force and the current at the load and the self-induction of the line is very small; but, so far as I am aware, my present invention is the first means of this general character to be devised which will accurately indicate the potential at the load whatever may be the amount and character of the load or the properties of the line.

In order to accomplish the desired result, I provide at the generating-station a means for obtainining electromotive forces respectively in step with and proportional to the electromotive force of the generator, the counter electromotive force due to ohmic drop in the line and the counter electromotive force due to inductive drop in the line, and so combine these electromotive forces that the resultant electromotive force is in step with and proportional to the electromotive force at the load end of the line, a suitable indicating device being employed and so located as to properly indicate the value of this resultant electromotive force. These electromotive forces, which are respectively proportional to and in step with the inductive and ohmic counter electromotive forces of the line, and which for convenience I will designate as the "miniature" inductive and ohmic electromotive forces, are obtained by means of an inductive resistance and a non-inductive resistance bearing the same ratio to each other as that existing between the corresponding properties of the main line. A current is caused to flow through these resistances, which for convenience I will designate as the "miniature" current, and which is in step with and proportional to the current in the main line. This current may be the main-line current itself, or it may be a current obtained from the secondary of a series converter through the primary of which the main-line current flows. The electromotive force in step with and proportional to the generator electromotive force, which I will designate as the "miniature impressed" electromotive force, may be the generator electromotive force itself, or it may be the electromotive force obtained from the secondary of a converter in shunt to the generator. The series converter included in the line and the shunt-converter connected across the generator-terminals may both be employed, or one of them may be omitted; but in every case either the one or the other is necessary. The respective values of the miniature ohmic and inductive electromotive forces must bear the same ratio to the miniature impressed electromotive force as the corresponding quantities of the main line bear to the generator electromotive force, this ratio being easily obtained by properly adjusting the values of the inductive and non-inductive resistances with respect to that of the current flowing through them.

In the accompanying drawings, Figure 1 is a diagram of a distribution system embodying a form of my invention in which both a shunt and a series connected converter are employed. Fig. 2 is a similar diagram in which a series converter only is employed. Fig. 3 is a diagram showing a modification involving the use of a shunt-connected converter alone. Fig. 4 is a modification embodying two converters, and Fig. 5 a further modification in which a single shunt-converter is employed.

Referring in detail to the drawings, 1 is an alternating-current generator, and 2 and 3 the main-line circuit leading therefrom.

4 represents the load upon the main circuit, which may be of any character suited to the use of alternating electric currents.

5 is a converter, the primary of which is in shunt to the main line, and 6 a second converter having its primary in series with the main-line circuit. The secondaries of these converters are included in a local circuit 7. Included in this local circuit are a non-inductive resistance 8 and an inductive resistance 9. A volt-meter 10 and condenser 11 are connected across this circuit, as shown in the drawings.

It is generally understood that the ampere-turns in the primary and secondary of a good converter are always very nearly equal to and in step with each other. It follows, therefore, that if the converters 5 and 6 are properly designed their primaries and secondaries will bear this relation. The current derived from the secondary of the latter will therefore be in step with the current in circuit 2 3, and the electromotive force at the terminals of the secondary of the former will be in step with that impressed upon the main line by the generator 1. The ratio of conversion may be anything desired, as is well understood.

The resistances 8 and 9 are shown in the drawings as adjustable in order to indicate that they may be adapted to different circuits, but for any one circuit they will be designed and adjusted once for all to represent a constant value, and no change in their proportions or values will be at any time made for this particular circuit, since the inductive and non-inductive resistances of the main line for any given circuit will remain constant. It is, of course, to be understood that any desired form of resistance suitable to the purpose may be employed, the illustrations given being merely conventional. It is also apparent that the shunt-converter may be so designed as to include either a portion or all of the necessary resistance, both inductive and non-inductive, and the separate resistances be correspondingly modified or omitted altogether. It is essential in this apparatus that the current in the local circuit due to the electromotive force of the shunt-converter, when there is no current in the main circuit, should be very small, and in most cases it probably will be so small that it need not be considered. Wherever it is necessary, however, the effect of this current may be annulled by including a condenser of properly-adjusted capacity in shunt to the series converter, as indicated at 11.

In the particular form of apparatus above described it will be borne in mind that the main-line generator electromotive force will be slightly augmented by the electromotive force projected through the converter 6 by the converter 5, and the resistances will be designed and their values adjusted accordingly.

It will be apparent from the foregoing description that any change in the potential in the work-circuit will be immediately indicated by the volt-meter 10 and that the electromotive force of the generator may be easily and readily regulated in accordance with the reading of the volt-meter in order to maintain the desired potential at the load.

In the modification shown in Fig. 2 the shunt-converter is dispensed with, the other apparatus remaining the same as in the form shown in Fig. 1. It is obvious that the several parts of the apparatus may be so designed as to obtain the desired results with this arrangement, although a step-down converter in circuit would under most circumstances probably be more desirable. It will be understood that with this arrangement of apparatus the electromotive force of the converter 6 exerted in the main line may be compensated for by properly designing the resistances 8 and 9.

In Fig. 3 the inductive and non-inductive resistances 8 and 9 are included in the main line, that portion of the line in this modification forming a portion of the local circuit 7' which includes the volt-meter 10. The operation of this modification and the results secured are substantially the same as those in the forms above described.

The arrangement of apparatus shown in Fig. 4 is substantially the same as in Fig. 3, except that a converter is included in the local circuit between the volt-meter and the resistances 8 and 9, thus forming substantially two local circuits 7' and 7", the first of which contains the resistances and the primary of the converter 6, and the second the volt-meter and the secondaries of both converters 5 and 6. In this modification, and also in that shown in Fig. 3, the resistances 8 and 9, being included in the main line, constitute respectively a part of its ohmic and inductive resistance, and must therefore be taken into account in designing the apparatus in order that the ratios between the respective electromotive forces heretofore specified may be exactly secured.

In Fig. 5 I have shown a single converter connected in shunt to the main line and a local circuit 7''', including the secondary of this converter 5, the inductive and non-inductive resistances and the volt-meter, said local circuit forming a part of the main line. In this modification the resistances may be partially or wholly included in the converter, as indicated in connection with the form shown in Fig. 1, if desired. In this modification, as well as in that shown in Fig. 1, it may be necessary in designing the resistances 8 and 9 to take into account a small increase in the electromotive force impressed upon the line by the generator due to that of the converter 5. It will also be understood that with any of the forms shown and described the shunt connection with the main line 2 3 might be made adjacent to the outer end of the local circuit instead of at the generator end.

It will be apparent from the foregoing description that, whichever form of my invention may be employed, the miniature current will be proportional to and in step with the current in the main circuit, and that this miniature current will bear the same phase relation to the miniature impressed electromotive force that the main-circuit current bears to the generator electromotive force impressed upon the main line. It follows, therefore, that the volt-meter 10, which indicates the value of the resultant of the compounded miniature impressed electromotive force and the miniature inductive and non-inductive counter electromotive forces, will indicate proportionally the value of the resultant of the compounded generator electromotive force and the inductive and non-inductive counter electromotive forces of the main circuit. As the values of these main-circuit counter electromotive forces and their phase relations to the generator electromotive force are changed by variations in the amount and character of the load, the resultant electromotive force will obviously be varied accordingly and its value will be immediately indicated by the volt-meter. If it is desired to maintain a constant potential at the load, it is therefore obviously necessary to so regulate the generator electromotive force as to maintain a constant reading of the volt-meter. In any event, the potential at the load will be indicated at the generating-station, and the information thus afforded may be utilized as may be found necessary or desirable.

It will be understood that other modifications may be made by any one skilled in the art which will be within the spirit and scope of my invention, those illustrated and described being merely typical examples of modifications by which the desired results may be obtained.

I claim as my invention—

1. A station potential indicator for alternating current systems comprising a local circuit in which the inductive and non-inductive counter electromotive forces and the impressed electromotive force of the main line are reproduced in miniature, and a volt meter for indicating the value of the resultant of these electromotive forces.

2. A station potential indicator comprising a local circuit having ohmic and inductive counter electromotive forces proportional to those of the main line, the respective ends of said local circuit having a shunt and a series connection with the main line, one or both of said connections being inductive, and means for indicating the potential at the load end of the main line, substantially as described.

3. A local circuit having the ohmic and inductive counter electromotive forces of the line represented in miniature, a series converter having its primary in the main circuit and its secondary in the local circuit, a condenser in shunt to said series converter, connections between the local and main circuits whereby an electromotive force is impressed upon the former which is proportional to that impressed upon the latter and means for indicating potential changes, substantially as described.

4. Potential indicating apparatus for alternating current systems comprising means for reproducing locally in miniature the ohmic and inductive electromotive forces and the impressed electromotive force of the main line, and a device for indicating the value of the resultant obtained by combining such electromotive forces.

5. The method of determining at any desired point in an alternating current circuit potential changes at the load which consists in producing locally electromotive forces, respectively proportional to the impressed electromotive force and the ohmic and inductive electromotive forces of the main line and indicating the value of the resultant of said electromotive forces.

6. The method of determining the potential changes at the load in an alternating current circuit which consists in producing and compounding three electromotive forces, one of which is proportional to and in step with the generator electromotive force and the other two of which are respectively proportional to and in step with the ohmic and inductive counter electromotive forces of the line itself, thereby producing a resultant electromotive force which is proportional to and in step with that at the load and indicating the value of said resultant electromotive force.

7. The combination with an alternating current circuit, of a local circuit in which are represented the self induction and resistance of the main line and having a current proportional to and in step with the main current, connections between the local and main circuits whereby the electromotive force impressed upon the former may be proportional to and in step with that impressed upon the latter, and a volt meter for indicating the resultant electromotive force, substantially as described.

In testimony whereof I have hereunto subscribed my name this 23d day of April, A. D. 1895.

RALPH D. MERSHON.

Witnesses:
WESLEY G. CARR,
WM. G. WATT.